US010830955B2

(12) United States Patent
Michit et al.

(10) Patent No.: US 10,830,955 B2
(45) Date of Patent: Nov. 10, 2020

(54) INTEGRATED PHOTONIC INTERCONNECT SWITCH AND INTEGRATED PHOTONIC INTERCONNECT NETWORK

(71) Applicant: STMicroelectronics (Crolles 2) SAS, Crolles (FR)

(72) Inventors: Nicolas Michit, Grenoble (FR); Patrick Le Maitre, Biviers (FR)

(73) Assignee: STMicroelectronics (Crolles 2) SAS, Crolles (FR)

( * ) Notice: Subject to any disclaimer, the term of this patent is extended or adjusted under 35 U.S.C. 154(b) by 0 days.

(21) Appl. No.: 16/123,829

(22) Filed: Sep. 6, 2018

(65) Prior Publication Data

US 2019/0079247 A1 Mar. 14, 2019

(30) Foreign Application Priority Data

Sep. 11, 2017 (FR) ...................................... 17 58338

(51) Int. Cl.
G02B 6/12 (2006.01)
G02B 6/26 (2006.01)
G02B 6/42 (2006.01)
G02B 6/293 (2006.01)

(52) U.S. Cl.
CPC ..... G02B 6/29343 (2013.01); G02B 6/12007 (2013.01)

(58) Field of Classification Search
CPC .......................... G02B 6/29343; G02B 6/12007
USPC ................................ 385/14, 17, 30, 32, 130
See application file for complete search history.

(56) References Cited

U.S. PATENT DOCUMENTS

| | | | |
|---|---|---|---|
| 6,411,752 B1 | 6/2002 | Little et al. | |
| 2012/0045167 A1* | 2/2012 | Julien | G02B 6/12002 385/14 |
| 2012/0251042 A1 | 10/2012 | Julien et al. | |
| 2015/0055951 A1 | 2/2015 | Mehrvar et al. | |
| 2015/0168803 A1* | 6/2015 | Xu | G02F 1/353 359/332 |

FOREIGN PATENT DOCUMENTS

| | | |
|---|---|---|
| EP | 1176438 A1 | 1/2002 |
| EP | 3080662 | 6/2015 |

OTHER PUBLICATIONS

Andrzej Kazmi Erczak et al: Optimization of an Integrated Opticla Crossbarin SOI Technology for Optical Networks on Chip Journal of Telecommunications and Informati On Technology, vol. 3, Jan. 1, 2007 (Jan. 1, 2007), pp. 109-114, XP55474836 ISSN: 1509-4553—p. 110; figures 5,7.

(Continued)

*Primary Examiner* — Kaveh C Kianni
*Assistant Examiner* — Hung Q Lam
(74) *Attorney, Agent, or Firm* — Crowe & Dunlevy

(57) ABSTRACT

A photonic interconnect switch is formed by first and second linear optical waveguides that cross to form an intersection. First and second redirecting photonic ring resonators are coupled together in an intermediate optical coupling zone and are controllable with an electrical signal. The first ring resonator is coupled to the first optical waveguide in a first optical coupling zone. The second ring resonator is coupled to the second optical waveguide in a second optical coupling zone.

13 Claims, 14 Drawing Sheets

(56) References Cited

OTHER PUBLICATIONS

Andrzej Kazmi Erczak et al: Synthesis of Highly Integrated Optical Network Base on Microdisk-Resonator Add-Drop Filters in Silicon-On-Insulator Technology vol. 48, No. 10—Oct. 1, 2009 (Oct. 1, 2009), p. 104601, XP55474804,—Belli Ngham—ISSN: 0091-3286, DOI: 10.1117/1.3242841—p. 1, colonne 1, al i néa 1; figure 1.
Kazmierczak A et al: Highly Integrated Optical 4X4 Crossbar in Silicon-On-Insulator Technology Journal of Lightwave Technology, IEEE Service Center, New York, NY, US—vol. 27, No. 16, Aug. 15, 2009 (Aug. 15, 2009)-, pp. 3317-3323, XP011281151,—ISSN: 0733-8724, DOi: 10.1109/J LT .2008.2010462—figures 3,4,9.
De Heyn et al., Fabrication Tolerant Four-Channel WDM Filter Based on Collectively Tuned Si Microrings, Journal of Lightwave Technology, vol. 31, No. 16, 2013.
Yangjin Ma, Ultralow loss single layer submicron silicon waveguide crossing for SOI optical interconnect, Optic Express, vol. 21, issue 24, 2013.
H. Shabani "Loss aware switch design and non blocking detection algorithm for intra-chip scale photonic interconnection networks", IEEE Transactions on Computers (vol. 65, Issue: 6, Jun. 2016 ).
Sherwood-Droz, et al., "Optical 4×4 hitless silicon router for optical Networks-on-Chip (NoC)," 2008.
PhoxTrot, "Design of 4×4 on-chip switching matrix", 2012.
Poon A W et al: Cascaded Microresonator-Based Matrix Switch for Silicon On-Chip Optical Interconnection Proceedings of the IEEE, IEEE. New York-US . vol. 97. No. 7 .—Jul. 1, 2009 (Jul. 1, 2009). pp. 1216-1238, XP011262463, ISSN: 0018-9219—tableau.
INPI Search Report and Written Opinion for FR 1758338 dated May 25, 2018 (10 pages).
Bianco, Andrea, et al: "Optical Interconnection Networks Based on Microring Resonators," J. Opt. Commun. Netw/ vol. 4, No. 7, Jul. 2012, pp. 546-556.

* cited by examiner

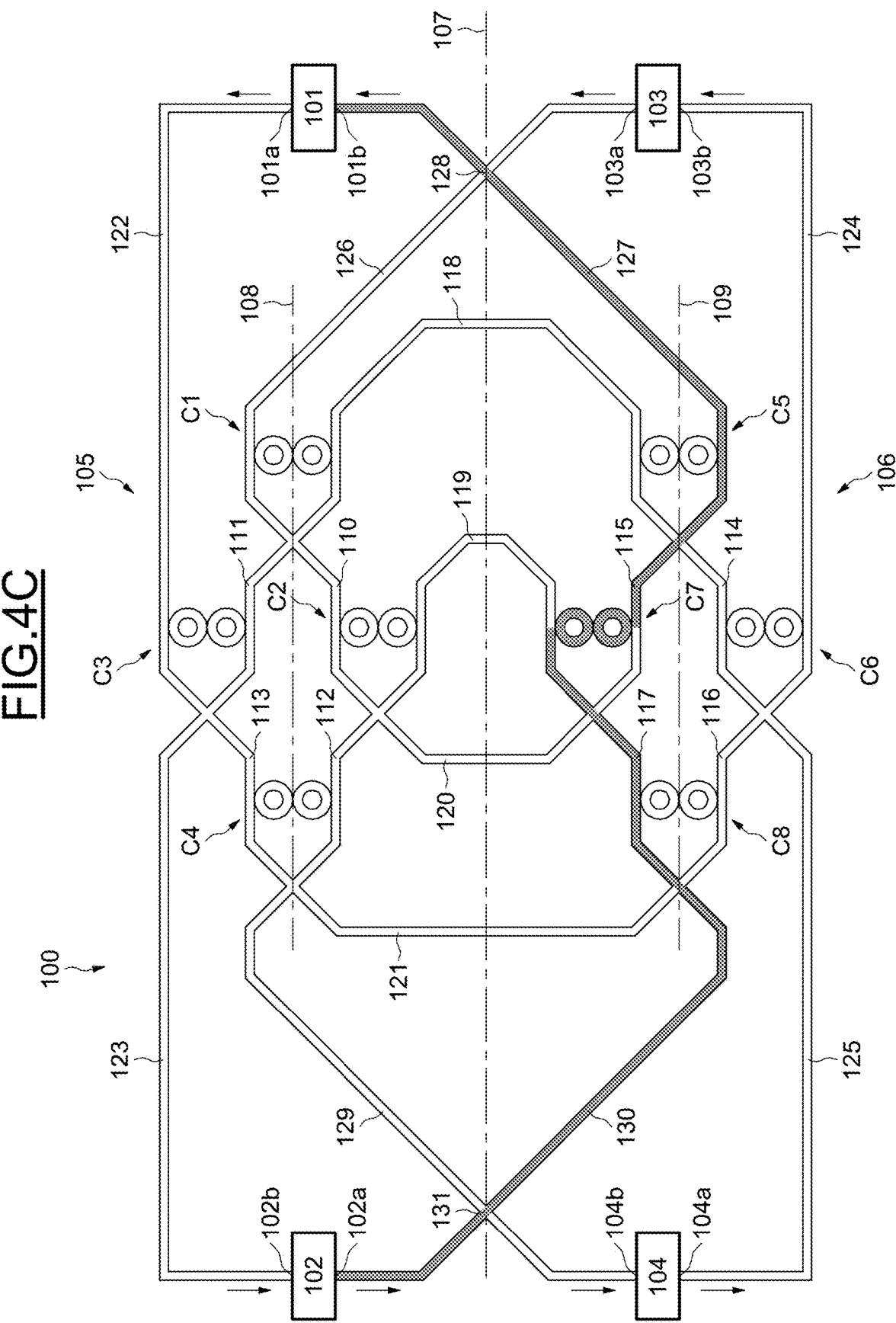

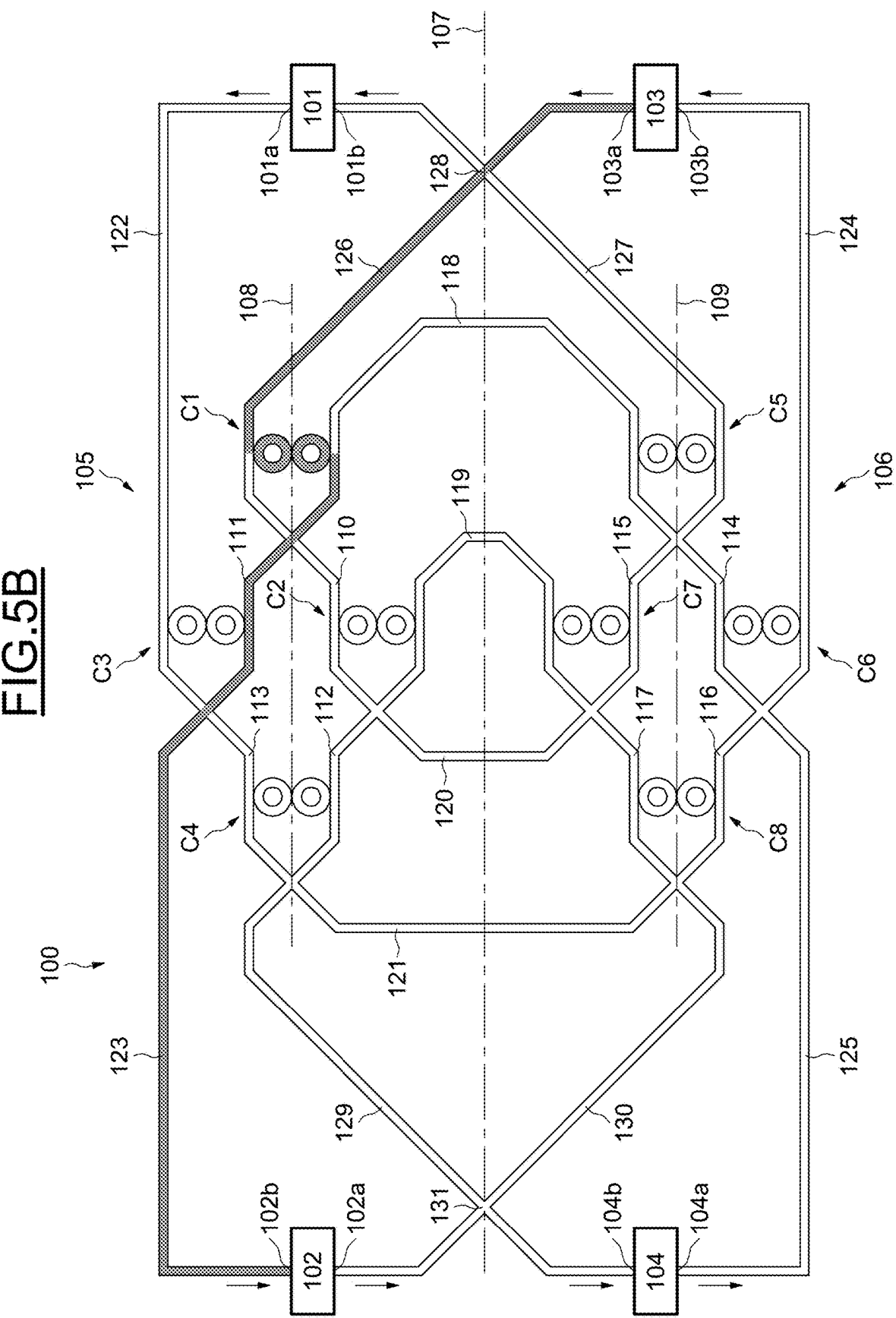

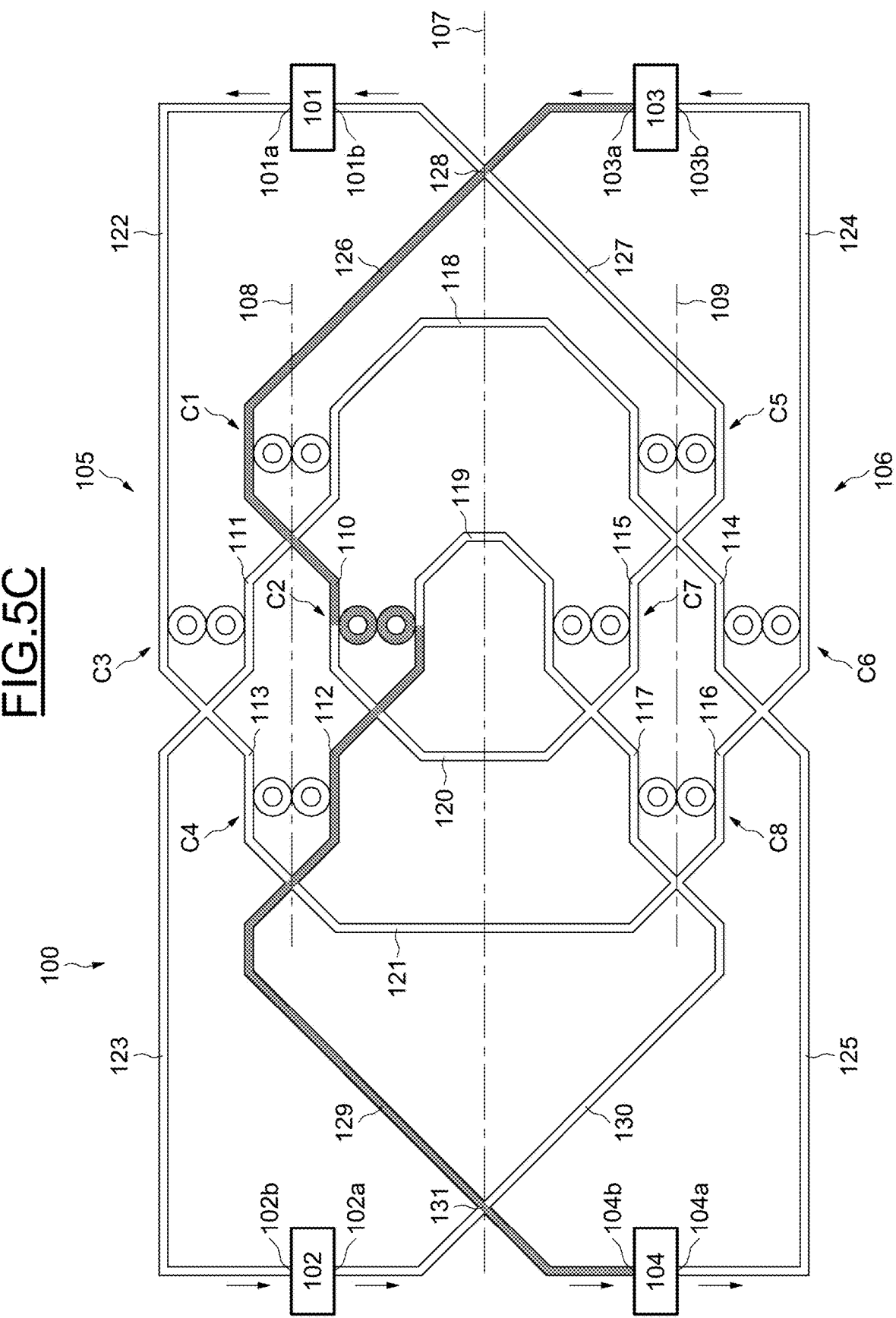

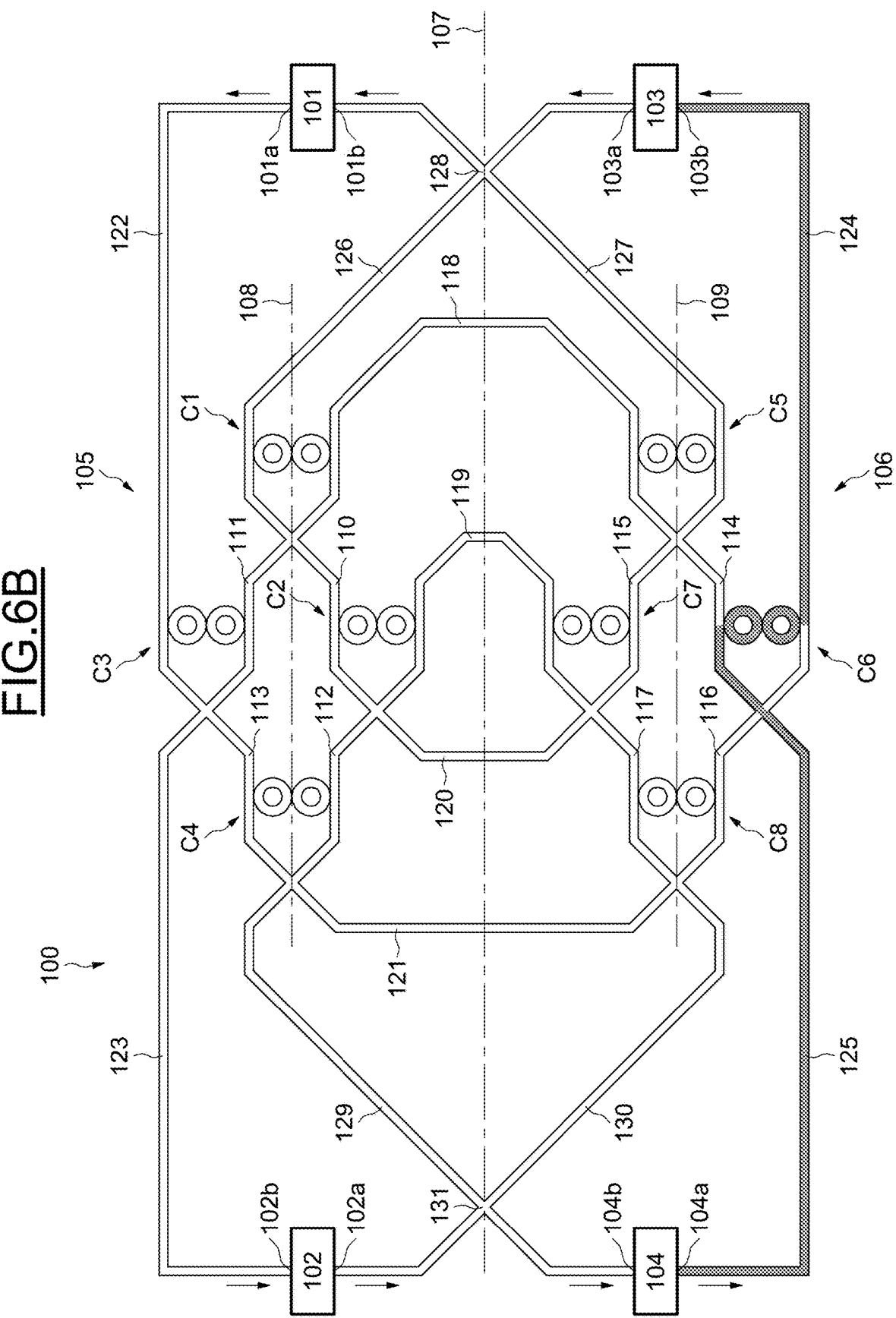

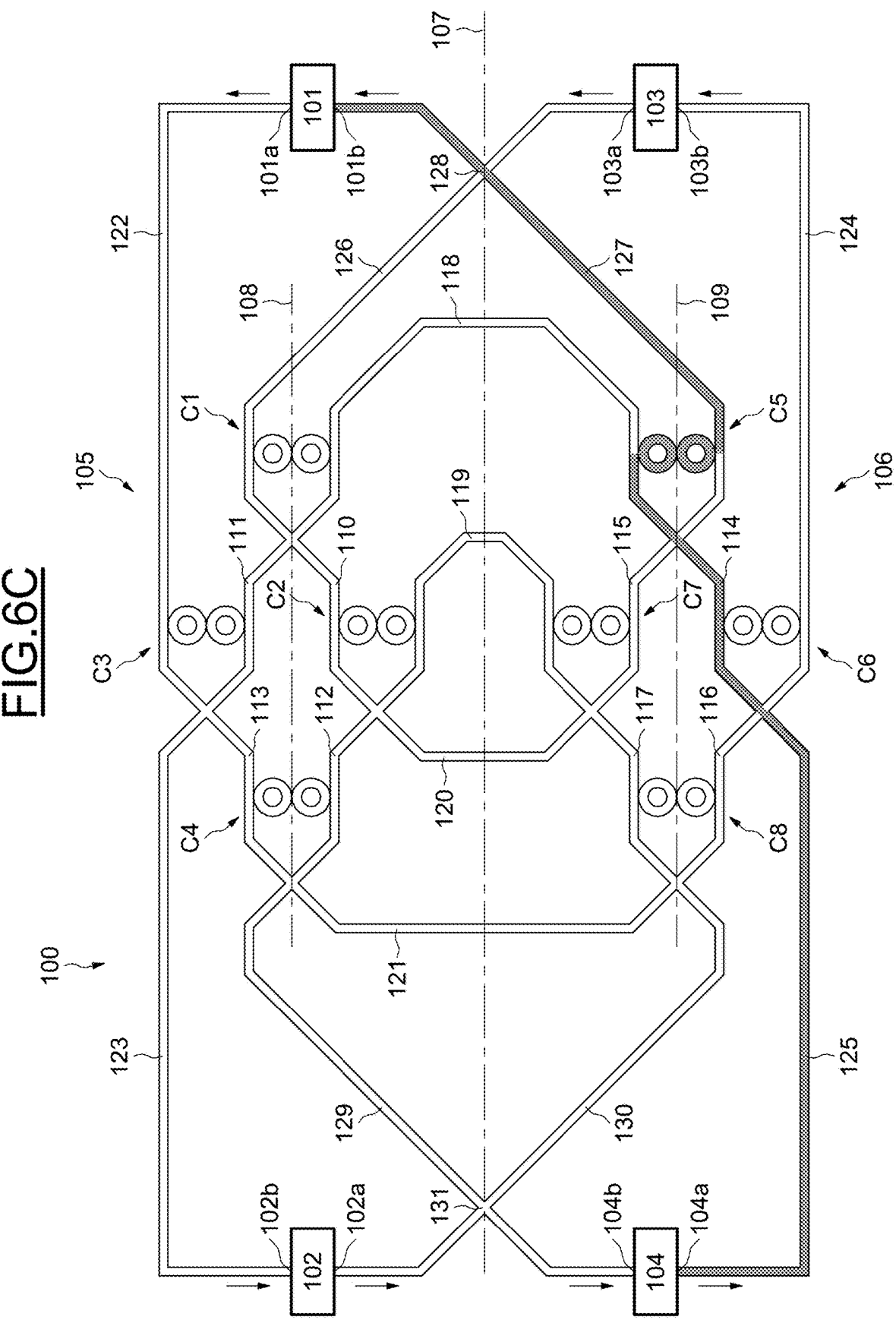

INTEGRATED PHOTONIC INTERCONNECT SWITCH AND INTEGRATED PHOTONIC INTERCONNECT NETWORK

PRIORITY CLAIM

This application claims the priority benefit of French Application for Patent No. 1758338, filed on Sep. 11, 2017, the content of which is hereby incorporated by reference in its entirety to the maximum extent allowable by law.

TECHNICAL FIELD

Embodiments relate to the field of photonic interconnect switches integrated into optoelectronic chips and of photonic interconnect networks integrated into optoelectronic chips and including such switches.

BACKGROUND

Linear optical waveguides that are integrated into optoelectronic chips and able to confine and guide light are known.

Photonic interconnect switches that are integrated into optoelectronic chips, allowing photons to be transferred from one optical waveguide to another optical waveguide via a redirecting ring resonator that is controllable by an electrical signal, are also known.

Generally, the resonator comprises an integrated ring and an integrated electronic component adjacent to this ring and controllable with an electrical signal, the integrated ring having sections adjacent to the optical waveguide so as to form zones of optical coupling between the ring and the optical waveguides.

In the absence of an electrical signal, the integrated ring is in what is called a "non-resonant" state such that a light wave, guided to a coupling zone by an optical waveguide, passes through this coupling zone and continues its journey in this optical waveguide.

In contrast, in the presence of an electrical signal, the integrated electronic component modifies the state of the integrated ring, which is then placed in what is called a "resonant" state such that a light wave that reaches a coupling zone via one of the optical waveguides is transferred to the integrated ring then transferred to the other optical waveguide via the other coupling zone, the light wave continuing its journey in the other optical waveguide in an opposite direction.

The structures described above are commonly produced on silicon and silicon-on-insulator (SOI) substrates.

Moreover, H. Shabani "Loss aware switch design and non-blocking detection algorithm for intra-chip scale photonic interconnection networks", IEEE Transactions on Computers (Volume: 65, Issue: 6, Jun. 1, 2016), incorporated by reference, proposes complex photonic interconnect networks that are integrated into optoelectronic chips and that comprise a plurality of optical waveguides and a plurality of switches such as described above, and that include intersections between the optical waveguides, with a view to selectively transferring, by selectively controlling the resonators, data and packets of data between sources and recipients.

The photonic interconnect networks described above are limited by losses due to crosstalk, which losses degrade the transmitted signals when the optical waves pass through the intersections or resonators. These losses should be limited as much as possible.

SUMMARY

A photonic interconnect switch integrated into an optoelectronic chip is proposed, which comprises first and second linear optical waveguides that cross to form an intersection and that respectively have first and second ends and third and fourth ends; and first and second redirecting photonic ring resonators that are coupled together in an intermediate optical coupling zone and that are controllable with an electrical signal.

Furthermore, the first ring resonator is coupled to the first optical waveguide in a first optical coupling zone that is located on the side of said first end and the second ring resonator is coupled to the second optical waveguide in a second optical coupling zone that is located on the side of said third end.

Advantageously, the switch may have an axis of symmetry passing through said intersection and said intermediate coupling zone between said ring resonators.

The first and second optical waveguides may comprise first parallel sections that are coupled to said resonators and crosswise second sections that cross to form said intersection.

Moreover, a photonic interconnect network integrated into an optoelectronic chip is proposed, which comprises at least one photonic interconnect switch such as defined above.

Moreover, a photonic interconnect network integrated into an optoelectronic chip is also proposed, which comprises a first group of four switches such as defined above and a second group of four switches such as defined above.

The first group of switches are connected as follows. A link links the second end of a first switch and the first end of a second switch, so that the first optical waveguides of the first and second switches are in series. A link links the fourth end of the first switch and the third end of a third switch, so that the second optical waveguides of the first and third switches are in series. A link links the fourth end of the second switch and the third end of a fourth switch, so that the second optical waveguides of the second and fourth switches are in series. A link links the second end of the third switch and the first end of the fourth switch, so that the first optical waveguides of the third and fourth switches are in series.

The second group of switches are connected as follows. A link links the second end of a fifth switch and the first end of a sixth switch, so that the first optical waveguides of the fifth and sixth switches are in series. A link links the fourth end of the fifth switch and the third end of a seventh switch, so that the second optical waveguides of the fifth and seventh switches are in series. A link links the fourth end of the sixth switch and the third end of an eighth switch, so that the second optical waveguides of the sixth and eighth switches are in series. A link links the second end of the seventh switch and the first end of the eighth switch, so that the first optical waveguides of the seventh and eighth switches are in series.

Furthermore, said network containing two groups of switches comprises: a link between the third end of the first switch and the first end of the fifth switch; a link between the third end of the second switch and the first end of the seventh switch; a link between the second end of the second switch and the fourth end of the seventh switch; and a link between the second end of the fourth switch and the fourth end of the eighth switch.

Advantageously, said network containing two groups of switches may have the following arrangements. The first ends of the first and third switches may be connected to external links. The fourth ends of the third and fourth switches may be connected to external links. The third ends of the fifth and sixth switches may be connected to external connections. The second ends of the sixth and eighth switches may be connected to external links.

The first group of switches may have an axis of symmetry passing through the intersections of the optical waveguides of the first and fourth switches, the second and third switches being on either side of this axis of symmetry.

The second group of switches may have an axis of symmetry passing through the intersections of the optical waveguides of the fifth and eighth switches, the sixth and seventh switches being on either side of this axis of symmetry.

The first group of switches and the second group of switches may be produced on either side of an axis of symmetry, the second and seventh switches being on the side of this axis of symmetry.

Said external links that are connected to the first and fifth switches may cross to form an intersection and said external links that are connected to the fourth and eighth switches may cross to form an intersection.

Said external links that are connected to the third and fifth switches, said external links that are connected to the first and sixth switches, said external links that are connected to the third and eighth switches and said external links that are connected to the fourth and sixth switches may be respectively connected to devices having connections for emitting and receiving optical waves.

BRIEF DESCRIPTION OF THE DRAWINGS

A photonic interconnect switch, integrated into an electronic chip, and a photonic interconnect network, integrated into an electronic chip, including switches will now be described by way of non-limiting examples, which are illustrated by the drawings, in which:

FIGS. 3A-3C, 4A-4C, 5A-5C and 6A-6C show ways in which optical waves may be routed through the network of FIG. 2.

DETAILED DESCRIPTION

Figure 1:
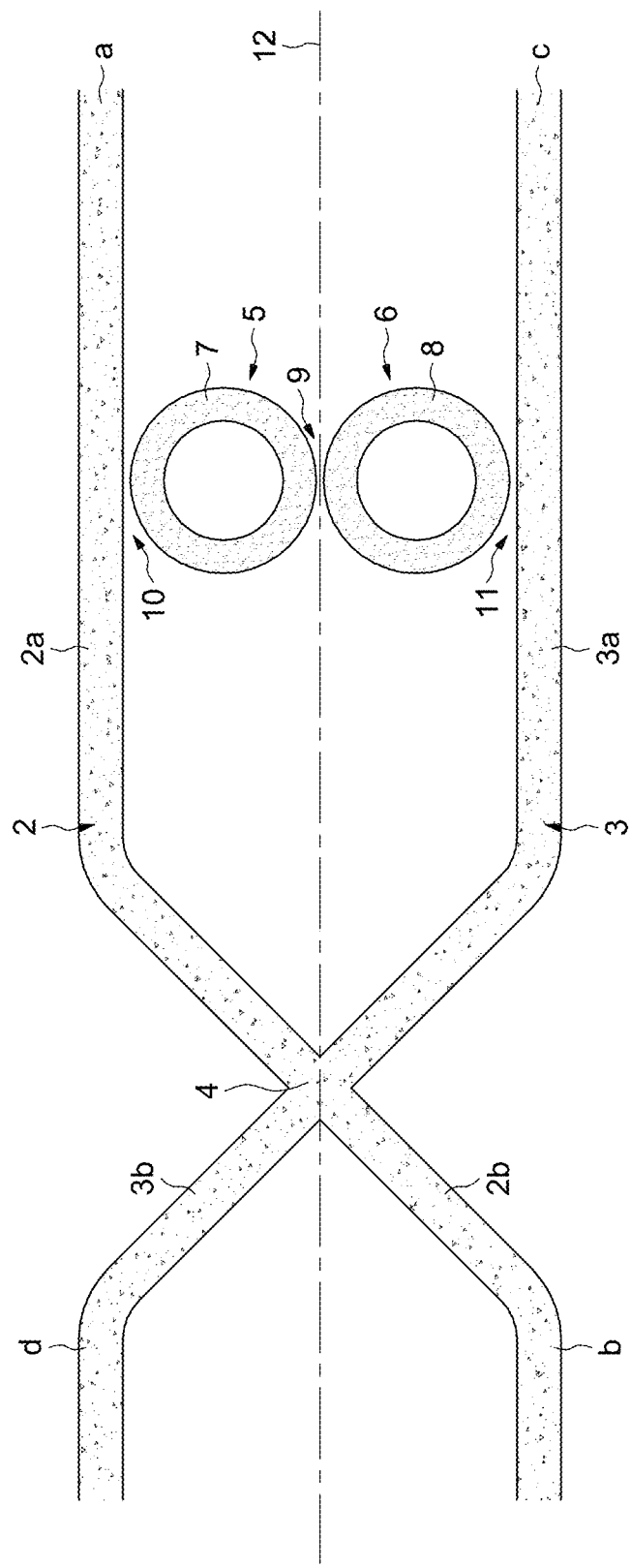
FIG. 1 shows a top view of an integrated photonic interconnect switch.

FIG. 1 illustrates a photonic interconnect switch 1 integrated into an optoelectronic chip.

The switch 1 comprises, in the same plane, first and second linear optical waveguides 2 and 3 that cross to form an intersection 4, with waveguide 2 having first and second ends a and b and waveguide 3 having third and fourth ends c and d.

The switch 1 comprises first and second redirecting photonic ring resonators 5 and 6 that are controllable with an electrical signal.

The redirecting photonic ring resonators 5 and 6 comprise rings 7 and 8 forming optical waveguides. The rings 7 and 8 are produced in the same plane as the optical waveguides 2 and 3, between the optical waveguides 2 and 3 and on the side of the intersection 4 associated with ends a and c.

The rings 7 and 8 are adjacent so as to form a local intermediate optical coupling zone 9 therebetween. The ring 7 is adjacent to the optical waveguide 2 so as to form a first optical coupling zone 10 therebetween. The ring 8 is adjacent to the optical waveguide 3 so as to form a second local optical coupling zone 11 therebetween. The local optical coupling zones 9, 10 and 11 form what are called "evanescent" optical couplings.

The rings 7 and 8 are associated with integrated components (not shown), which, when they are subjected to an electrical signal, are able to modify the state of the ring resonators 5 and 6.

The switch 1 advantageously has, for reasons of ease of manufacture, a longitudinal geometric axis of symmetry 12 passing through the intersection 4 and through the intermediate coupling zone 9 between the ring resonators 5 and 6.

Advantageously, the waveguides 2 and 3 and the rings 7 and 8 are identical, in sections (width and thickness) and in material constitution, such that the waveguides 2 and 3 and the rings 7 and 8 can be manufactured during the same operations.

In one particular arrangement, which is illustrated in FIG. 1, the optical waveguides 2 and 3 comprise rectilinear sections 2a and 3a that are parallel to the axis of symmetry 12 and between which the rings 7 and 8 of the ring resonators 5 and 6 are placed, and rectilinear sections 2b and 3b that cross to form the intersection 4 and that are oriented at 45° with respect to the axis of symmetry 12 so as to form a cross. The centers of the rings 7 and 8 are placed on a line that is perpendicular to the rectilinear sections 2a and 3a of the optical waveguides 2 and 3.

The switch 1 operates in the following way.

In the absence of an electrical signal activating the resonators 5 and 6, the rings 7 and 8 are in an "OFF" (non-resonant) state. A light wave entering via one of the ends of the optical waveguide 2 exits via the other end of the optical waveguide 2 after having passed through the intersection 4, and a light wave entering via one of the ends of the optical waveguide 3 exits directly via the other end of the optical waveguide 3 after having passed through the intersection 4.

In the presence of an electrical signal activating said integrated electronic components associated with the resonators 5 and 6, the rings 7 and 8 of the resonators 5 and 6 are in an "ON" (resonant) state. The following redirections occur.

A light wave entering via the end a of the optical waveguide 2, when it reaches the coupling zone 10, is redirected towards the optical waveguide 3 via, in succession, the rings 7 and 8. Next, the light wave is directed towards the end d of the optical waveguide 3 via the intersection 4.

A light wave entering via the end c of the optical waveguide 3, when it reaches the coupling zone 11, is redirected towards the optical waveguide 2 via, in succession, the rings 8 and 7. Next, the light wave is directed towards the end b of the optical waveguide 2 via the intersection 4.

A light wave entering via the end b of the optical waveguide 2, when it reaches the coupling zone 10 after having passed through the intersection 4, is redirected towards the optical waveguide 3 via, in succession, the rings 7 and 8. Next, the light wave is directed towards the end c of the optical waveguide 3.

A light wave entering via the end d of the optical waveguide 3, when it reaches the coupling zone 11 after having passed through the intersection 4, is redirected towards the optical waveguide 2 via, in succession, the rings 8 and 7. Next, the light wave is directed towards the end a of the optical waveguide 2.

As a result, any light wave that enters passes through the intersection 4, as it is either routed directly from one end to the other of the optical waveguides 2 and 3 or redirected from one of the optical waveguides 2 and 3 to the other.

The curves of resonance versus frequency (or wavelength) of each resonator follow conventional Lorentz distributions. However, the order of the distribution of the resonance of the switch 1 is of higher order, this allowing both parasitic signals of different wavelengths to be rejected and maximum transmission to be guaranteed for wavelengths close to the resonance, with the aim of preserving the spectral density of the modulated signal and therefore its form in the time domain.

Figure 2:
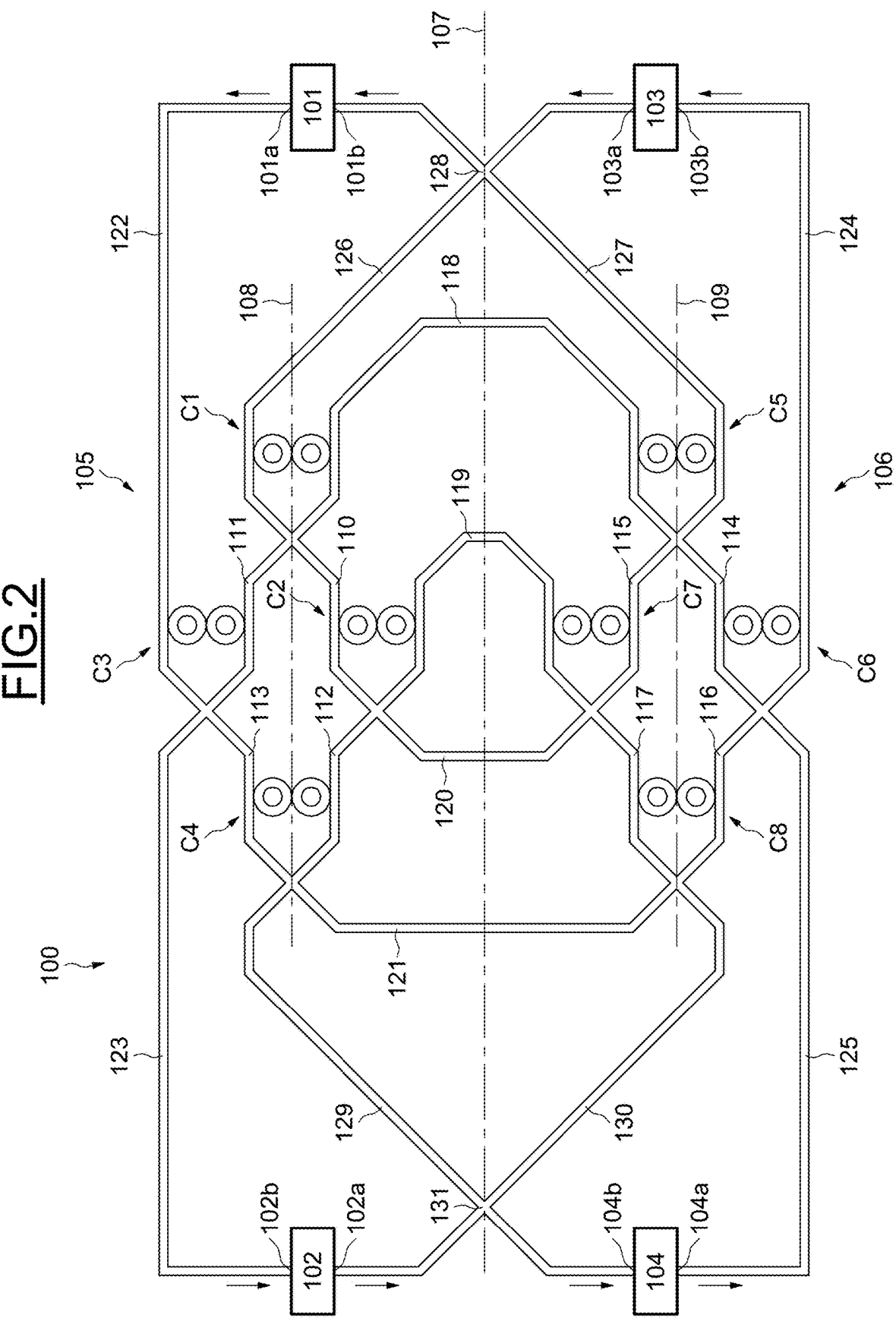
FIG. 2 shows a top view of an integrated photonic interconnect network including eight switches.

FIG. 2 illustrates a photonic interconnect network 100 integrated into an optoelectronic chip, which network is intended to selectively form photonic connections between four electronic devices 101, 102, 103 and 104 that respectively have optical connections.

The network 100 comprises a first group 105 of four switches C1, C2, C3 and C4 and a second group 106 of four switches C5, C6, C7 and C8. These eight switches each correspond to the switch 1 described above with reference to FIG. 1, the optical waveguides 2 and 3 and the rings 7 and 8 being produced in the same plane.

The eight switches are placed so that their axes of symmetry 12 are parallel to a main longitudinal geometric axis of symmetry 107 (which runs from right to left in FIG. 2) and so that their intersections 4 are on the same side with respect to the rings 7 and 8 (on the left-hand side in FIG. 2).

The groups 105 and 106 are placed symmetrically on either side of the main axis of symmetry 107.

The switches C1, C2, C3 and C4 of the first group 105 are placed symmetrically with respect to a secondary axis of symmetry 108 that is parallel to the main axis of symmetry 107, these switches being placed in the zones of corners of a rhombus. The axes of symmetry 12 of the switches C1 and C4 are on the secondary axis of symmetry 108. The switches C1 and C4 are longitudinally offset, the switch C1 being on the right in FIG. 2 and the switch C4 being on the left. The switches C2 and C3 are on either side of the secondary axis of symmetry 108, the switch C2 being on the side of the main axis of symmetry 107.

The sections 3a of the second guides 3 of the switches C1, C2, C3 and C4 are on the side of the main axis of symmetry 107 with respect to the sections 2a of the first optical waveguide 2, so that the ends c and b are on the side of the main axis of symmetry 107 with respect to the ends a and d.

The switches C5, C6, C7 and C8 of the second group 106 are placed symmetrically with respect to a secondary axis of symmetry 109 that is parallel to the main axis of symmetry 107, these switches being placed in the zones of the corners of a rhombus. The axes of symmetry 12 of the switches C5 and C8 are on the secondary axis of symmetry 108. The switches C5 and C8 are longitudinally offset, the switch C5 being on the right in FIG. 2 and the switch C8 being on the left. The switches C6 and C7 are on either side of the secondary axis of symmetry 109, the switch C7 being on the side of the main axis of symmetry 107.

The sections 2a of the first guides 2 of the switches C5, C6, C7 and C8 are on the side of the main axis of symmetry 107 with respect to the sections 3a of the second optical waveguides 3, so that the ends a and d are on the side of the main axis of symmetry 107 with respect to the ends c and b.

The centers of the rings 7 and 8 of the switches C1 and C5 are on the same line perpendicular to the main axis of symmetry 107.

The intersections 4 of the switches C1 and C5 are on the same line perpendicular to the main axis of symmetry 107.

The centers of the rings 7 and 8 of the switches C2, C3, C6 and C7 are on the same line perpendicular to the main axis of symmetry 107.

The intersections 4 of the switches C2, C3, C6 and C7 are on the same line perpendicular to the main axis of symmetry 107.

The centers of the rings 7 and 8 of the switches C4 and C8 are on the same line perpendicular to the main axis of symmetry 107.

The intersections 4 of the switches C4 and C8 are on the same line perpendicular to the main axis of symmetry 107.

The electronic device 101 is on the side of the switch C1, on the right in FIG. 1.

The electronic device 102 is on the side of the switch C4, on the left in FIG. 1.

The electronic device 103 is on the side of the switch C5, on the right in FIG. 1.

The electronic device 104 is on the side of the switch C8, on the right in FIG. 1.

Optical links, taking the form of sections of optical waveguides, are formed in the following way.

A link 110 links the end b of the first optical waveguide of the switch C1 to the end a of the first optical waveguide of the switch C2, so that the first optical waveguides of switches C1 and C2 are in series.

A link 111 links the end d of the second optical waveguide of the switch C1 to the end c of the second optical waveguide of the switch C3, so that the second optical waveguides of switches C1 and C3 are in series.

A link 112 links the end d of the second optical waveguide of the switch C2 to the end c of the second optical waveguide of the switch C4, so that the second optical waveguides of switches C2 and C4 are in series.

A link 113 links the end b of the first optical waveguide of the switch C3 to the end a of the first optical waveguide of the switch C4, so that the first optical waveguides of switches C3 and C4 are in series.

A link 114 links the end b of the first optical waveguide of the switch C5 to the end a of the first optical waveguide of the switch C6, so that the first optical waveguides of switches C5 and C6 are in series.

A link 115 links the end d of the second optical waveguide of the switch C5 to the end c of the second optical waveguide of the switch C7, so that the second optical waveguides of switches C5 and C7 are in series.

A link 116 links the end d of the second optical waveguide of the switch C6 to the end c of the second optical waveguide of the switch C8, so that the second optical waveguides of switches C6 and C8 are in series.

A link 117 links the end b of the first optical waveguide of the switch C7 to the end a of the first optical waveguide of the switch C8, so that the first optical waveguides of switches C7 and C8 are in series.

A link 118, which passes through the main axis of symmetry 107, links the end c of the second optical waveguide of the switch C1 to the end a of the first optical waveguide of the switch C5, so that the second optical waveguide of the switch C1 and the first optical waveguide of the switch C5 are in series.

A link 119, which passes through the main axis of symmetry 107, links the end c of the second optical waveguide of the switch C2 to the end a of the first optical waveguide of the switch C7, so that the second optical waveguide of the switch C2 and the first optical waveguide of the switch C7 are in series.

A link 120, which passes through the main axis of symmetry 107, links the end b of the first optical waveguide of the switch C2 to the end d of the second optical waveguide of the switch C7, so that the first optical waveguide of the switch C2 and the second optical waveguide of the switch C7 are in series.

A link 121, which passes through the main axis of symmetry 107, links the end b of the first optical waveguide of the switch C4 to the end d of the second optical waveguide of the switch C8, so that the first optical waveguide of the switch C4 and the second optical waveguide of the switch C8 are in series.

The end a of the first optical waveguide of the switch C1, the end a of the first optical waveguide of the switch C3, the end c of the second optical waveguide of the switch C5, the end c of the second optical waveguide of the switch C6, the end d of the second optical waveguide of the switch C3, the end d of the second optical waveguide of the switch C4, the end b of the first optical waveguide of the switch C6, and the end b of the second optical waveguide of the switch C8, form the exterior connections of the network 1.

As a result of the arrangements described above, the network 1 contains no other intersection than the intersections 4 of the switches C1 to C8.

One particular way of linking the aforementioned exterior connections of the network 1 to the devices 101 to 104, which each comprise two optical connections, will now be described.

A link 122 links the end a of the first optical waveguide of the switch C3 to a connection 101a of the device 101, so that the first optical waveguide of the switch C3 and the connection 101a are in series.

A link 123 links the end d of the second optical waveguide of the switch C3 to a connection 102b of the device 102, so that the second optical waveguide of the switch C3 and the connection 102b are in series.

A link 124 links the end c of the second optical waveguide of the switch C6 to a connection 103b of the device 103, so that the second optical waveguide of the switch C6 and the connection 103b are in series.

A link 125 links the end b of the first optical waveguide of the switch C6 to a connection 104a of the device 104, so that the first optical waveguide of the switch C6 and the connection 104a are in series.

A link 126, which passes through the main axis of symmetry 107, links the end a of the first optical waveguide of the switch C1 to a connection 103a of the device 103, so that the first optical waveguide of the switch C1 and the connection 103a are in series.

A link 127, which passes through the main axis of symmetry 107, links the end c of the second optical waveguide of the switch C5 to a connection 101b of the device 101, so that the second optical waveguide of the switch C5 and the connection 101b are in series.

The links 126 and 127 cross to form an intersection 128 the center of which is located on the main axis of symmetry 107.

A link 129, which passes through the main axis of symmetry 107, links the end d of the second optical waveguide of the switch C4 to a connection 104b of the device 104, so that the second optical waveguide of the switch C4 and the connection 104b are in series.

A link 130, which passes through the main axis of symmetry 107, links the end b of the first optical waveguide of the switch C8 to a connection 102a of the device 102, so that the first optical waveguide of the switch C8 and the connection 102a are in series.

The links 129 and 130 cross to form an intersection 131 the center of which is located on the main axis of symmetry 107.

Thus, only the complementary intersections 128 and 131 are added to the intersections 4 of the switches C1 to C8.

Considering one of the connections of the devices 101, 102, 103 and 104 to be an input and the other an output, the following is one particular arrangement. Nevertheless, an inverse arrangement could be adopted.

On the one hand, the connection 101a of the device 101, the connection 102a of the device 102, the connection 103a of the device 103 and the connection 104a of the device 104 are emitting connections over which optical waves are emitted. Thus, in correspondence and respectively, the links 122, 130, 126 and 125 form inputs via which optical waves enter into the network 100.

On the other hand, the connection 101b of the device 101, the connection 102b of the device 102, the connection 103b of the device 103 and the connection 104b of the device 104 are receiving connections over which optical waves are received. Thus, in correspondence and respectively, the links 127, 123, 124 and 129 form outputs via which optical waves exit the network 100.

Considering each of the devices 101 to 104 to be such that it is able to receive, at a given time, light waves originating from a single device other than itself, the following ways of routing or optical paths may be achieved by selectively activating the resonators 5 and 6 of the switches C1 to C8.

Figure 3A:
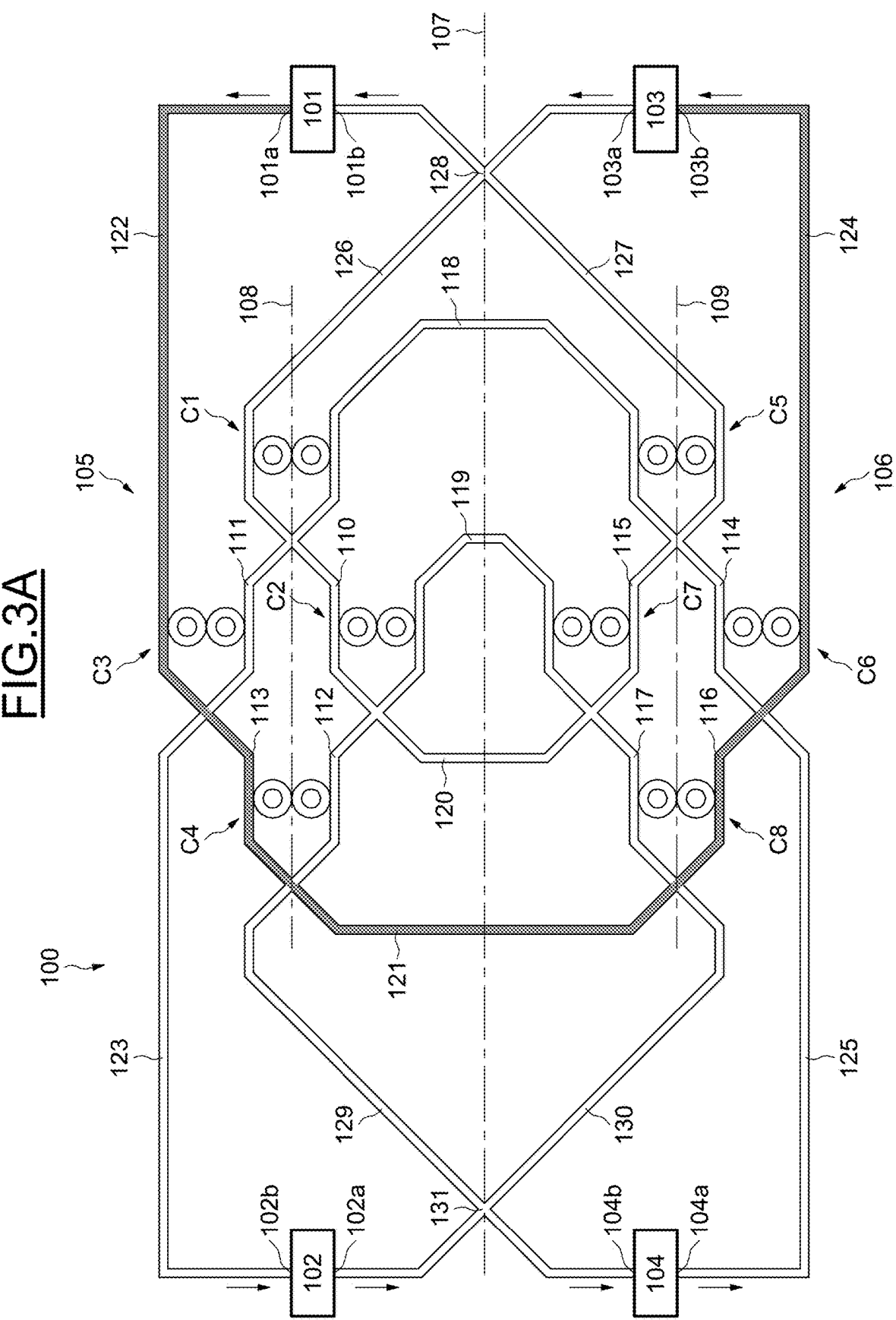

FIG. 3A illustrates the case where an optical wave is emitted over the emitting connection 101a of the device 101 and is routed to the receiving connection 103b of the device 103. The emitted optical wave is routed through the link 122, then through the first optical waveguide of the switch C3, then through the first optical waveguide of the switch C4, then through the link 121, then through the second optical waveguide of the switch C8, then through the second optical waveguide of the switch C6 and lastly through the link 124.

Figure 3B:
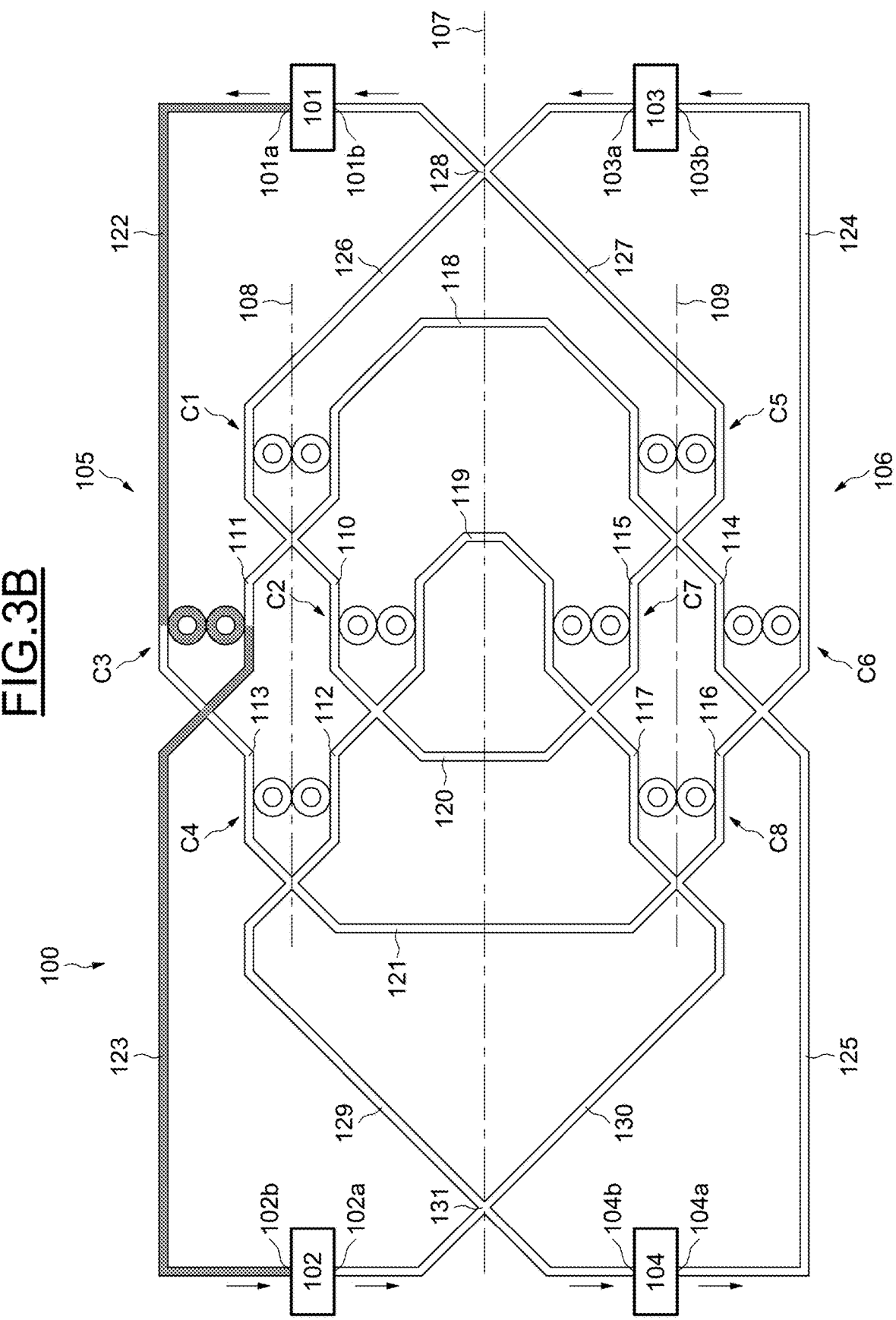

FIG. 3B illustrates the case where an optical wave is emitted over the emitting connection 101a of the device 101 and routed to the receiving connection 102b of the device 102 by activating the resonators of the switch C3. The emitted optical wave is routed through the link 122, then is switched in the switch C3 from the first optical waveguide thereof to the second optical waveguide thereof, and lastly passes through the link 123.

Figure 3C:
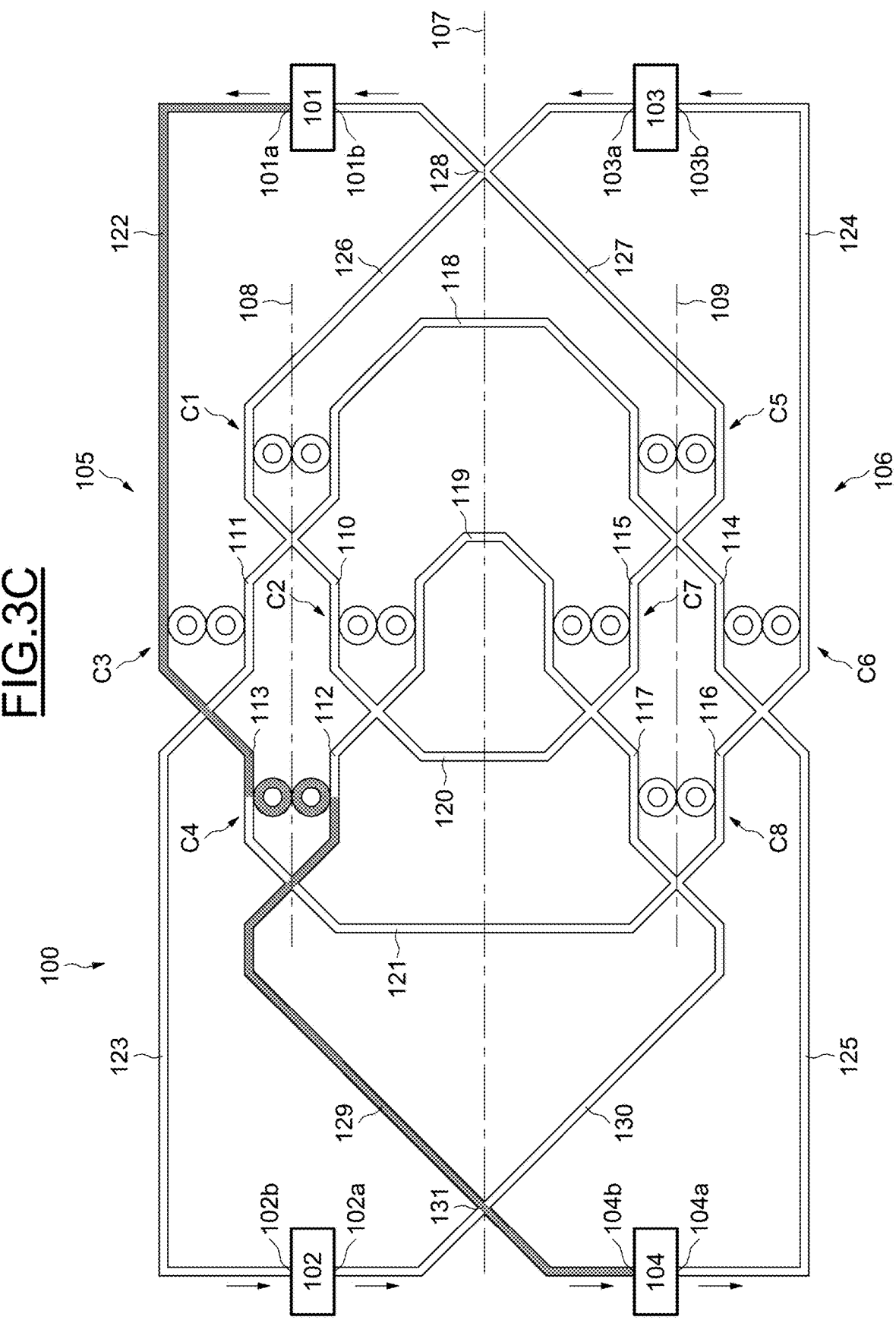

FIG. 3C illustrates the case where an optical wave is emitted over the emitting connection 101a of the device 101 and is routed to the receiving connection 103b of the device 103 by activating the resonators of the switch C4. The emitted optical wave is routed through the link 122, then through the first optical waveguide of the switch C3, then is switched in the switch C4 from the first optical waveguide thereof to the second optical waveguide thereof, and lastly passes through the link 129.

Figure 4A:
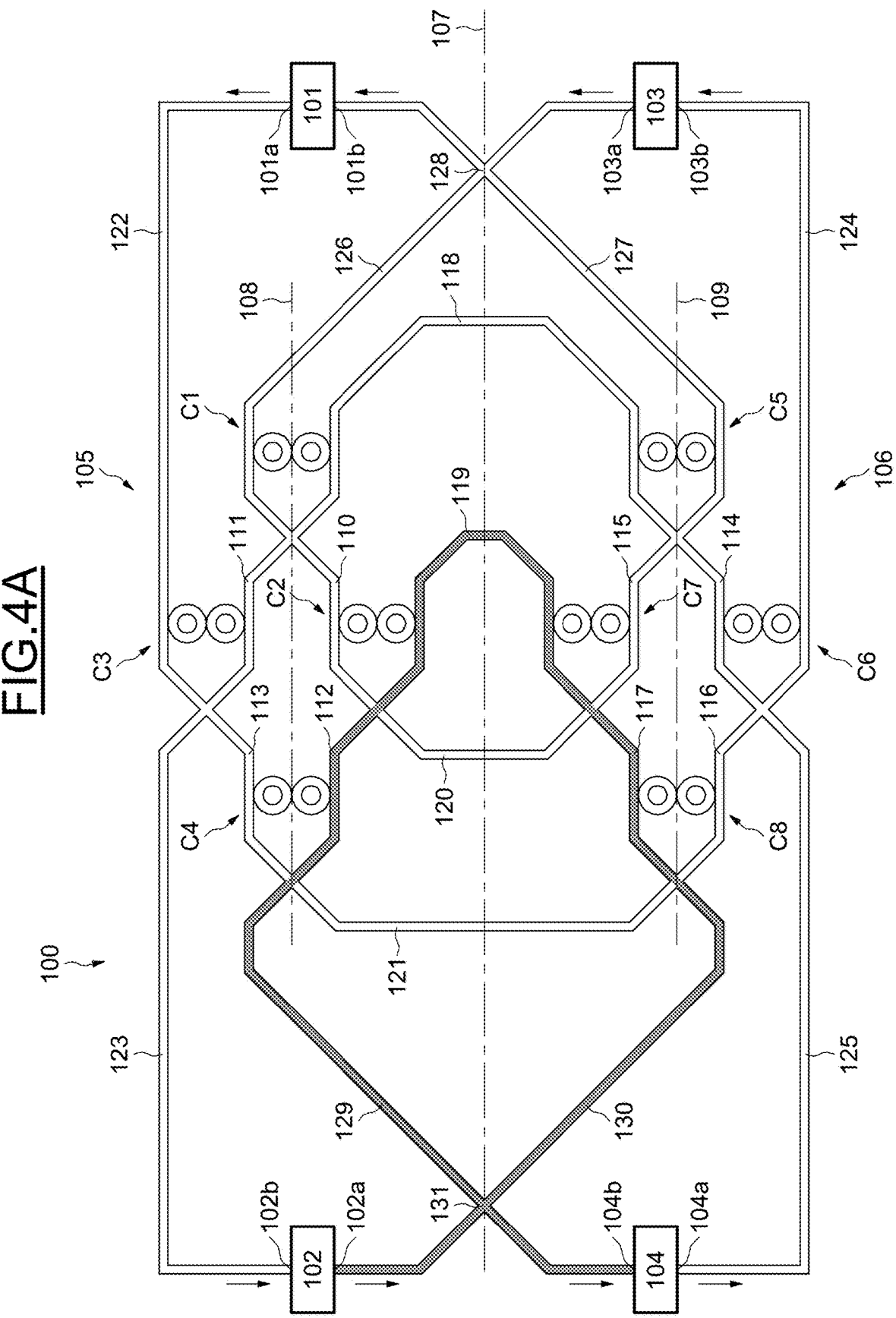

FIG. 4A illustrates the case where an optical wave is emitted over the emitting connection 102a of the device 102 and is routed to the receiving connection 104b of the device 104. The emitted optical wave is routed through the link 130, then through the first optical waveguide of the switch C8, then through the first optical waveguide of the switch C7, then through the link 119, then through the second optical waveguide of the switch C2, then through the second optical waveguide of the switch C4 and lastly through the link 129.

Figure 4B:
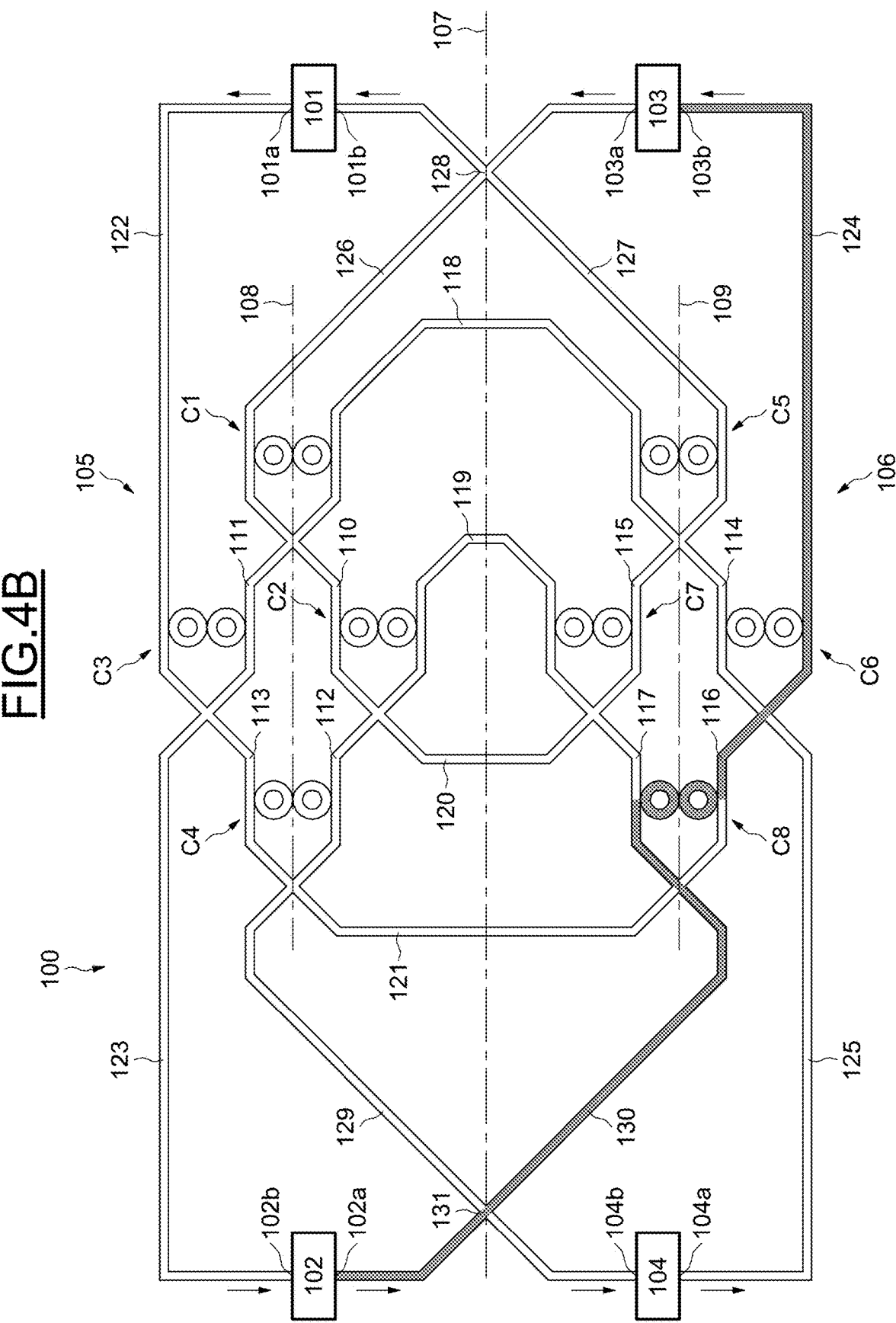

FIG. 4B illustrates the case where an optical wave is emitted over the emitting connection 102a of the device 102 and routed to the receiving connection 103b of the device 103 by activating the resonators of the switch C8. The emitted optical wave is routed through the link 130, then is switched in the switch C8 from the first optical waveguide thereof to the second optical waveguide thereof, then is routed through the second optical waveguide of the switch C6 and lastly passes through the link 124.

FIG. 4C illustrates the case where an optical wave is emitted over the emitting connection 102a of the device 102 and is routed to the receiving connection 101b of the device 101 by activating the resonators of the switch C7. The emitted optical wave is routed through the link 130, then through the first optical waveguide of the switch C8, then is switched in the switch C7 from the first optical waveguide thereof to the second optical waveguide thereof, then is routed through the second optical waveguide of the switch C5 and lastly passes through the link 127.

Figure 5A:
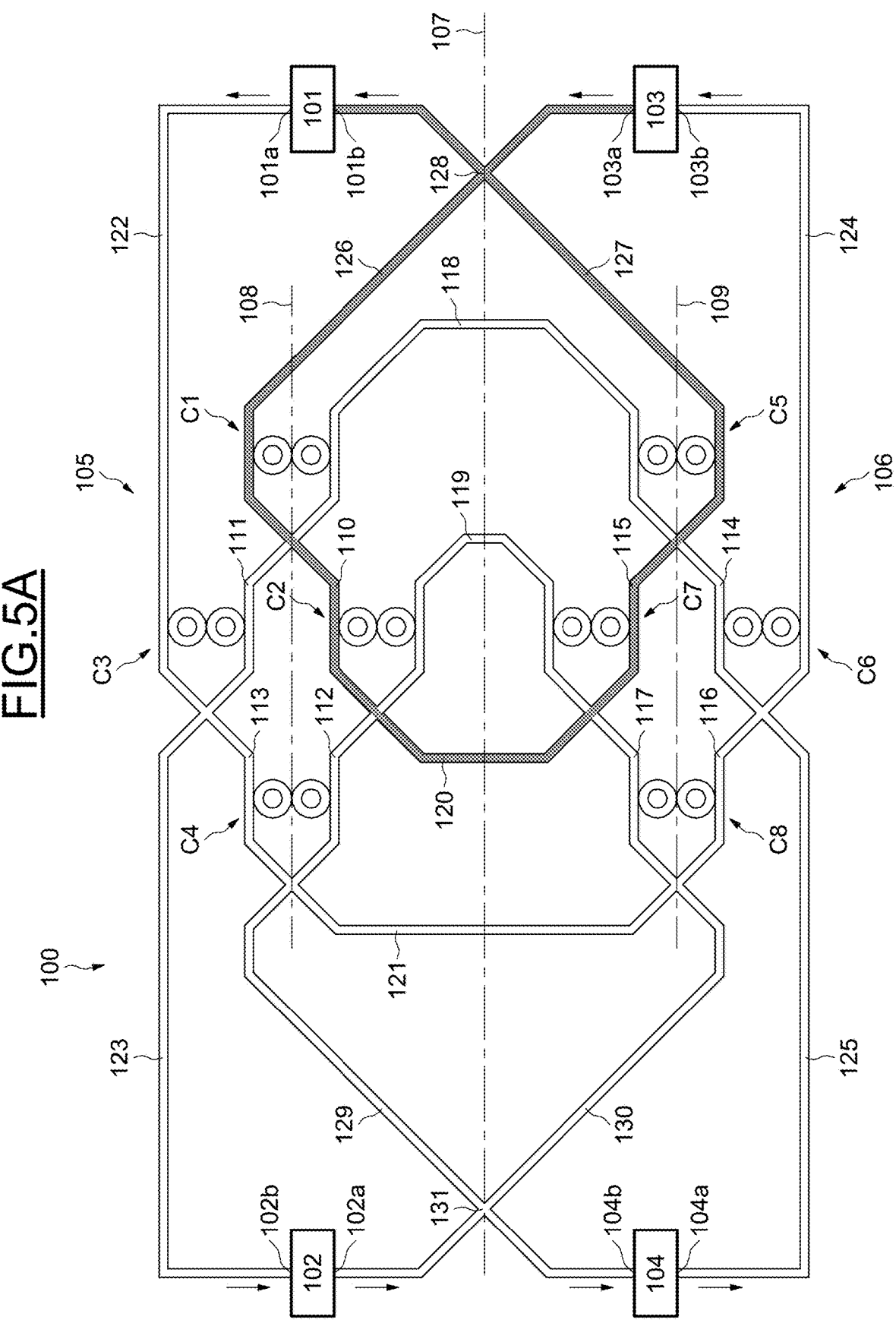

FIG. 5A illustrates the case where an optical wave is emitted over the emitting connection 103a of the device 103 and is routed to the receiving connection 101b of the device 101. The emitted optical wave is routed through the link 126, then through the first optical waveguide of the switch C1, then through the first optical waveguide of the switch C2, then through the link 120, then through the second optical waveguide of the switch C7, then through the second optical waveguide of the switch C5 and lastly through the link 127.

FIG. 5B illustrates the case where an optical wave is emitted over the emitting connection 103a of the device 103 and routed to the receiving connection 102b of the device 102 by activating the resonators of the switch C1. The emitted optical wave is routed through the link 126, then is switched in the switch C1 from the first optical waveguide thereof to the second optical waveguide thereof, then is routed through the second optical waveguide of the switch C3 and lastly passes through the link 123.

FIG. 5C illustrates the case where an optical wave is emitted over the emitting connection 103a of the device 103 and is routed to the receiving connection 104b of the device 104 by activating the resonators of the switch C2. The emitted optical wave is routed through the link 126, then through the first optical waveguide of the switch C1, then is switched in the switch C2 from the first optical waveguide thereof to the second optical waveguide thereof, then is routed through the second optical waveguide of the switch C4 and lastly passes through the link 129.

Figure 6A:
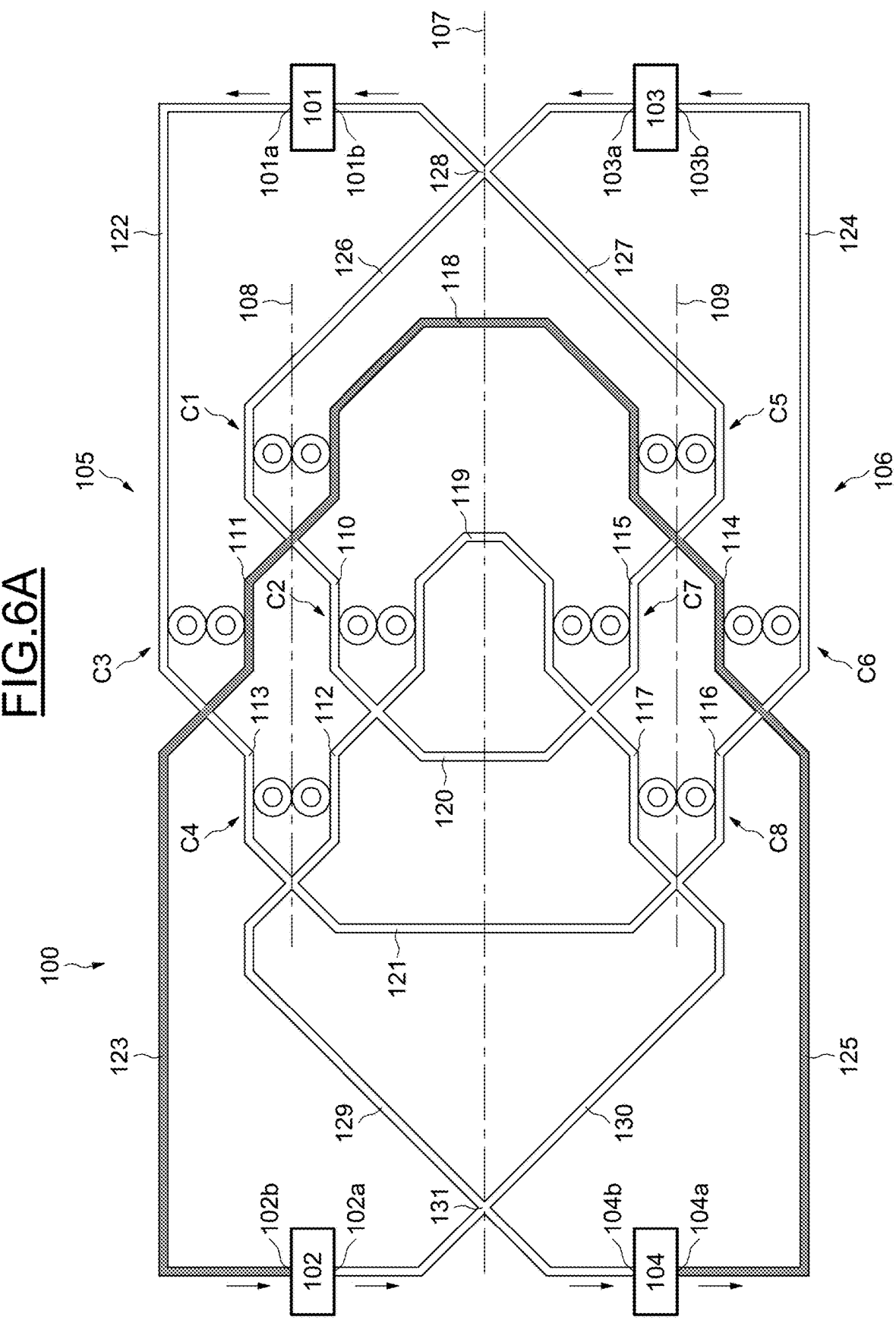

FIG. 6A illustrates the case where an optical wave is emitted over the emitting connection 104a of the device 104 and is routed to the receiving connection 102b of the device 102. The emitted optical wave is routed through the link 125, then through the first optical waveguide of the switch C6, then through the first optical waveguide of the switch C5, then through the link 119, then through the second optical waveguide of the switch C1, then through the second optical waveguide of the switch C3 and lastly through the link 123.

FIG. 6B illustrates the case where an optical wave is emitted over the emitting connection 104a of the device 104 and routed to the receiving connection 103b of the device 103 by activating the resonators of the switch C6. The emitted optical wave is routed through the link 125, then is switched in the switch C6 from the first optical waveguide thereof to the second optical waveguide thereof, then passes through the link 124.

FIG. 6C illustrates the case where an optical wave is emitted over the emitting connection 104a of the device 104 and is routed to the receiving connection 101b of the device 101 by activating the resonators of the switch C5. The emitted optical wave is routed through the link 125, then through the first optical waveguide of the switch C6, then is switched in the switch C5 from the first optical waveguide thereof to the second optical waveguide thereof, then passes through the link 127.

When the devices 101 and 102 communicate together (FIGS. 3B and 4C), the devices 103 and 104 may communicate together (FIGS. 5C and 6B) without interfering with the preceding devices.

When the devices 101 and 103 communicate together (FIGS. 3A and 5A), the devices 102 and 104 may communicate together (FIGS. 4A and 6A) without interfering with the preceding devices.

When the devices 101 and 104 communicate together (FIGS. 3C and 6C), the devices 102 and 103 may communicate together (FIGS. 4B and 5B) without interfering with the preceding devices.

When the devices 102 and 103 communicate together (FIGS. 4B and 5B), the devices 101 and 104 may communicate together (FIGS. 3C and 6C) without interfering with the preceding devices.

When the devices 102 and 104 communicate together (FIGS. 4A and 6A), the devices 101 and 103 may communicate together (FIGS. 3C and 5A) without interfering with the preceding devices.

As a result of the above, any of the devices 101 to 104 may freely transmit information to any other device simply provided that the fact that a device can receive signals from and emit signals to only a single other device at a time is respected. Therefore, although it comprises a small number of intersections, as indicated above, the network 100 is what is called a "non-blocking" network.

The invention claimed is:

1. A photonic interconnect switch integrated into an optoelectronic chip, comprising:
   first and second optical waveguides that cross to form an intersection, the first optical waveguide having first and second ends and the second optical waveguide having third and fourth ends; and
   first and second redirecting photonic ring resonators that are coupled together in an intermediate optical coupling zone and that are controllable with an electrical signal; and
   wherein:
   the first ring resonator is coupled to the first optical waveguide in a first optical coupling zone that is located on a side of the intersection associated with said first end; and
   the second ring resonator is coupled to the second optical waveguide in a second optical coupling zone that is located on a side of the intersection associated with said third end; and
   wherein the first and second optical waveguides comprise first sections extending parallel to each other that are coupled to said first and second ring resonators and second sections extending to cross each other to form said intersection.

2. The switch according to claim 1, having an axis of symmetry passing through said intersection and said intermediate coupling zone between said first and second ring resonators.

3. A photonic interconnect network integrated into an optoelectronic chip, comprising at least one photonic interconnect switch, wherein the at least one photonic interconnect switch comprises:
   first and second optical waveguides that cross to form an intersection, the first optical waveguide having first and second ends and the second optical waveguide having third and fourth ends; and first and second redirecting photonic ring resonators that are coupled together in an intermediate optical coupling zone and that are controllable with an electrical signal; and wherein:
the first ring resonator is coupled to the first optical waveguide in a first optical coupling zone that is located on a side of the intersection associated with said first end; and
the second ring resonator is coupled to the second optical waveguide in a second optical coupling zone that is located on a side of the intersection associated with said third end; and
wherein the first and second optical waveguides comprise first sections extending parallel to each other that are coupled to said first and second ring resonators and second sections extending to cross each other to form said intersection.

4. The photonic interconnect network according to claim 3, the at least one photonic interconnect switch having an axis of symmetry passing through said intersection and said intermediate coupling zone between said first and second ring resonators.

5. A photonic interconnect network integrated into an optoelectronic chip, comprising:
a first group of four photonic interconnect switches, wherein each photonic interconnect switch comprises:
first and second optical waveguides that cross to form an intersection, the first optical waveguide having first and second ends and the second optical waveguide having third and fourth ends; and
first and second redirecting photonic ring resonators that are coupled together in an intermediate optical coupling zone and that are controllable with an electrical signal; and
wherein:
the first ring resonator is coupled to the first optical waveguide in a first optical coupling zone that is located on a side of the intersection associated with said first end; and
the second ring resonator is coupled to the second optical waveguide in a second optical coupling zone that is located on a side of the intersection associated with said third end; ; and
wherein the first and second optical waveguides comprise first sections extending parallel to each other that are coupled to said first and second ring resonators and second sections extending to cross each other to form said intersection;
a link that links the second end of a first photonic interconnect switch and the first end of a second photonic interconnect switch, so that the first optical waveguides of the first and second photonic interconnect switches are in series;
a link that links the fourth end of the first photonic interconnect switch and the third end of a third photonic interconnect switch, so that the second optical waveguides of the first and third photonic interconnect switches are in series;
a link that links the fourth end of the second photonic interconnect switch and the third end of a fourth photonic interconnect switch, so that the second optical waveguides of the second and fourth photonic interconnect switches are in series; and
a link that links the second end of the third photonic interconnect switch and the first end of the fourth photonic interconnect switch, so that the first optical waveguides of the third and fourth photonic interconnect switches are in series.

6. The network according to claim 5, further comprising:
a second group of four switches;
a link that links the second end of a fifth photonic interconnect switch and the first end of a sixth photonic interconnect switch, so that the first optical waveguides of the fifth and sixth photonic interconnect switches are in series;
a link that links the fourth end of the fifth photonic interconnect switch and the third end of a seventh photonic interconnect switch, so that the second optical waveguides of the fifth and seventh photonic interconnect switches are in series;
a link that links the fourth end of the sixth photonic interconnect switch and the third end of an eighth photonic interconnect switch, so that the second optical waveguides of the sixth and eighth photonic interconnect switches are in series; and
a link that links the second end of the seventh photonic interconnect switch and the first end of the eighth photonic interconnect switch, so that the first optical waveguides of the seventh and eighth photonic interconnect switches are in series.

7. The network according to claim 6, further comprising;
a link between the third end of the first photonic interconnect switch and the first end of the fifth photonic interconnect switch;
a link between the third end of the second photonic interconnect switch and the first end of the seventh photonic interconnect switch;
a link between the second end of the second photonic interconnect switch and the fourth end of the seventh photonic interconnect switch; and
a link between the second end of the fourth photonic interconnect switch and the fourth end of the eighth photonic interconnect switch.

8. The network according to claim 7, wherein:
the first ends of the first and third photonic interconnect switches are connected to external links;
the fourth ends of the third and fourth photonic interconnect switches are connected to external links;
the third ends of the fifth and sixth photonic interconnect switches are connected to external connections; and
the second ends of the sixth and eighth photonic interconnect switches are connected to external links.

9. The network according to claim 6, wherein:
the first group of photonic interconnect switches has a first axis of symmetry passing through the intersections of the optical waveguides of the first and fourth photonic interconnect switches, the second and third photonic interconnect switches being on either side of the first axis of symmetry.

10. The network according to claim 6, wherein:
the second group of photonic interconnect switches has a second axis of symmetry passing through the intersections of the optical waveguides of the fifth and eighth photonic interconnect switches, the sixth and seventh photonic interconnect switches being on either side of the second axis of symmetry.

11. The network according to claim 6 above, wherein:
the first group of photonic interconnect switches and the second group of photonic interconnect switches are produced on either side of an axis of symmetry, the second and seventh photonic interconnect switches being on the side of the axis of symmetry.

12. The network according to claim 8, wherein:
said external links that are connected to the first and fifth photonic interconnect switches cross to form an intersection and said external links that are connected to the fourth and eighth photonic interconnect switches cross to form an intersection.

13. The network according to claim 12, wherein:
said external links that are connected to the third and fifth photonic interconnect switches, said external links that are connected to the first and sixth photonic interconnect switches, said external links that are connected to the third and eighth photonic interconnect switches and said external links that are connected to the fourth and to the sixth photonic interconnect switches are respectively connected to devices having connections for emitting and receiving optical waves.

* * * * *